(12) United States Patent
Geoffrin et al.

(10) Patent No.: US 8,458,010 B1
(45) Date of Patent: Jun. 4, 2013

(54) MONITORING AND ENFORCING PRICE PARITY

(75) Inventors: Beatrice A. Geoffrin, Luxembourg (LU); Dimitri P. Hoffmann, Diekirch (LU); Eric L. Broussard, Bertrange (LU)

(73) Assignee: Amazon Technologies, Inc., Reno, NV (US)

( * ) Notice: Subject to any disclaimer, the term of this patent is extended or adjusted under 35 U.S.C. 154(b) by 581 days.

(21) Appl. No.: 12/588,335

(22) Filed: Oct. 13, 2009

(51) Int. Cl.
*G06Q 99/00* (2006.01)
*G06Q 30/02* (2006.01)

(52) U.S. Cl.
CPC .................................. *G06Q 30/0238* (2013.01)
USPC ........ 705/7.35; 705/1.1; 705/7.29; 705/14.35; 705/26.1; 705/400

(58) Field of Classification Search
CPC .............................. G06Q 30/00; G06Q 20/201
USPC ................ 705/7.35, 14.1, 14.35, 14.39, 27.2, 705/26.1, 400
See application file for complete search history.

(56) References Cited

U.S. PATENT DOCUMENTS

| | | | |
|---|---|---|---|
| 5,455,875 A | 10/1995 | Chevion et al. | 382/311 |
| 5,465,308 A | 11/1995 | Hutcheson et al. | 382/159 |
| 5,805,745 A | 9/1998 | Graf | 382/291 |
| 5,826,244 A | 10/1998 | Huberman | 705/37 |
| 5,848,393 A | 12/1998 | Goodridge et al. | 705/8 |
| 5,862,223 A | 1/1999 | Walker et al. | 380/25 |
| 5,937,388 A | 8/1999 | Davis et al. | 705/8 |
| 6,012,066 A | 1/2000 | Discount et al. | 707/103 |
| 6,032,151 A | 2/2000 | Arnold et al. | 707/103 |
| 6,041,306 A | 3/2000 | Du et al. | 705/8 |
| 6,044,355 A | 3/2000 | Crockett et al. | 705/8 |
| 6,078,916 A | 6/2000 | Culliss | 707/5 |
| 6,128,380 A | 10/2000 | Shaffer et al. | 379/265 |
| 6,163,607 A | 12/2000 | Bogart et al. | 379/266 |
| 6,173,053 B1 | 1/2001 | Bogart et al. | 379/266 |
| 6,181,343 B1 | 1/2001 | Lyons | 345/358 |

(Continued)

FOREIGN PATENT DOCUMENTS

CN 101944217 A * 1/2011

OTHER PUBLICATIONS

"Web Intelligence—Mashing Up Information for Increased Market Transparency in the Tourism Industry", 2008, IiXt, 16 pgs.*

(Continued)

*Primary Examiner* — John Hayes
*Assistant Examiner* — Freda A Nelson
(74) *Attorney, Agent, or Firm* — Seed IP Law Group PLLC

(57) ABSTRACT

Systems and methods are provided for monitoring and enforcing price parity. In one implementation, a computer-implemented method monitors price parity. The method includes generating, by a server, a task related to pricing of an item. The server receives, in response to the task, a first price and a second price of the item. The first price corresponds to an offering price of the item by a third-party seller via a sales channel of a retailer and the second price corresponds to an offering price of the item by the third-party seller via a sales channel of the third-party seller. The server evaluates whether the second price violates a price parity rule, based on at least a comparison of the first price and the second price.

25 Claims, 4 Drawing Sheets

U.S. PATENT DOCUMENTS

| | | | |
|---|---|---|---|
| 6,182,068 B1 | 1/2001 | Culliss | 707/5 |
| 6,223,165 B1 | 4/2001 | Lauffer | 705/8 |
| 6,393,497 B1 | 5/2002 | Arnold et al. | 709/330 |
| 6,539,377 B1 | 3/2003 | Culliss | 707/5 |
| 6,546,087 B2 | 4/2003 | Shaffer et al. | 379/90.01 |
| 6,584,192 B1 | 6/2003 | Agusta | 379/265.12 |
| 6,584,464 B1 | 6/2003 | Warthen | 707/4 |
| 6,587,556 B1 | 7/2003 | Judkins et al. | 379/219 |
| 6,603,854 B1 | 8/2003 | Judkins et al. | 379/265.06 |
| 6,636,590 B1 | 10/2003 | Jacob et al. | 379/114.05 |
| 6,704,403 B2 | 3/2004 | Lurie et al. | 379/114.1 |
| 6,707,904 B1 | 3/2004 | Judkins et al. | 379/265.06 |
| 6,763,104 B1 | 7/2004 | Judkins et al. | 379/265 |
| 6,859,523 B1 | 2/2005 | Jilk et al. | 379/32.01 |
| 6,938,048 B1 | 8/2005 | Jilk et al. | 707/102 |
| 7,155,400 B1 | 12/2006 | Jilk et al. | 705/9 |
| 7,197,459 B1 | 3/2007 | Harinarayan et al. | 704/270.1 |
| 7,899,701 B1 * | 3/2011 | Odom | 705/7.35 |
| 8,019,650 B2 * | 9/2011 | Donsbach et al. | 705/26.1 |
| 2002/0069079 A1 | 6/2002 | Vega | 705/1 |
| 2002/0083079 A1 | 6/2002 | Meier et al. | 707/104.1 |
| 2003/0078852 A1 | 4/2003 | Shoen et al. | 705/26 |
| 2003/0198364 A1 | 10/2003 | Yonover et al. | 382/103 |
| 2003/0200156 A1 | 10/2003 | Roseman et al. | 705/27 |
| 2003/0204449 A1 | 10/2003 | Kotas et al. | 705/27 |
| 2004/0213437 A1 | 10/2004 | Howard et al. | 382/115 |
| 2004/0267740 A1 | 12/2004 | Liu et al. | 707/3 |
| 2005/0197749 A1 | 9/2005 | Nichols et al. | 701/3 |
| 2006/0106675 A1 | 5/2006 | Cohen et al. | 705/26 |
| 2006/0106774 A1 | 5/2006 | Cohen et al. | 707/3 |
| 2006/0149613 A1 | 7/2006 | Younger | 705/9 |
| 2007/0130090 A1 * | 6/2007 | Staib et al. | 705/400 |
| 2007/0162761 A1 | 7/2007 | Davis et al. | 713/182 |
| 2007/0174872 A1 | 7/2007 | Jing et al. | 725/46 |
| 2008/0010273 A1 | 1/2008 | Frank | 707/5 |
| 2010/0262482 A1 * | 10/2010 | Bous | 705/14.35 |

OTHER PUBLICATIONS

Gallant, Matthew, "A Step Towards Parity", Oct. 19, 2007, The Quixotic Engineer, A game design blog, 2 pages.*

"Amazon Seller Community", Apr. 21, 2009, amazonsellercommunity.com, createp's response to movieandmusicguy, 2 pages.*

"Expedia Streamlines Access to Its Global Network for Hotel Supply Partners", Jan. 16, 2008, Sesigntaxi.com, 5 pages.*

"How to implement Rate Parity | RateTiger", Aug. 18, 2005, Hospitality Net-Industry News, hospitalitynet.org, 3 pages.*

Marsh, Bryan, Price Parity Availability Distribution Equals More Online Bookings, eTourism.com blog, 2 pages.*

ETN Staff Writer, "How Can Hotel Price Parity Be Controlled?", Jan. 28, 2009; ETN Staff Writer, Travel Distribution Summit Asia 2009; eTurboNews.com, 4 pgs.*

Peter, Tim, Collecting Your Competitive Data (Guide to Small Business Ecommerce Strategy), May 20, 2008, timpeter.com, 5 pages.*

"Should the OTA-Hotel Relationship Vary as per the Economic Conditions?" Aug. 13, 2009, 4Hoteliers.com; 3 pages.*

Kirsch, Beth, The Case Against a Multi-Channel Affiliate Marketing Model, Dec. 20, 2005, pp. 5.*

"Walmart Launches Walmart Marketplace", Aug. 31, 2009, amazonstrategies.com, 5 pgs.*

U.S. Appl. No. 10/991,339, filed Nov. 16, 2004, Cohen et al.

U.S. Appl. No. 10/990,771, filed Nov. 16, 2004, Mortensen et al.

U.S. Appl. No. 12/020,469, filed Jan. 25, 2008, Deflaux et al.

"About Spending," retrieved Nov. 23, 2004, from http://www.mypoints.com/mp/dstatial.show?isref=nmhp.popup.aboutspending.default, 1 page.

"Earning Points with MyPoints," retrieved Nov. 23, 2004, from http://www.mypoints.com/mp/dstatial.show?isref=nmhp.popup.aboutearning.default, 1 page.

"FAQs," retrieved Nov. 23, 2004, from http://www.mypoints.com/mp/dstatial.show?isref=nmhp.popup.faq.default, 1 page.

"Frequently Asked Questions about the Open Mind Initiative," retrieved Nov. 16, 2004, from http://www.openmind.org/FAQs.html, pp. 1-3.

"Frequently Asked Questions," TrueDater FAQ's, retrieved Apr. 4, 2005, from http://www.truedater.com/index.php?action=faqs, pp. 1-2.

"Grid—The Competitive Advantage," Aug. 2004, retrieved Jun. 9, 2005, from http://www.sun.com/solutions/documents/articles/grid_adv_aa.xml?null, pp. 1-2.

"Join MyPoints Now," retrieved Nov. 23, 2004, from http://www.mypoints.com/?MCK=ccb67d8c41a3819b, pp. 1-4.

"Payment-On-Line (AOL, Compuserve, Internet, etc)," Oct. 20, 1994, retrieved Dec. 6, 2004, from http://groups-beta.google.com/group/misc.entrepreneurs/browse_thread/thread/80fcf110252bb3f7/ff1c8, pp. 1-3.

"The ESP Game," retrieved Jun. 8, 2005, from http://www.espgame.org, 1 page.

"What is BonusMail®?," retrieved Nov. 23, 2004, from http://www.mypoints.com/mp/dstatial.show?isref=nmhp.popup.bonusmail.default, 1 page.

"What is Keen," retrieved Jun. 8, 2005, from http://www.keen.com/documents/homepage/wik_pop.asp?TID=gbFQnFLPstnUuFonMtBmHw, 1 page.

"What is MyPoints," retrieved Nov. 23, 2004, from http://www.mypoints.com/mp/dstatial.show?isref=nmhp.popup.whatis.default, 1 page.

About, Inc., "Intelligent Agents," retrieved Jun. 9, 2005, from http://psychology.about.com./od/intelligentagents/, pp. 1-5.

About, Inc., "Our Story," retrieved Jun. 9, 2005, from http://ourstory.about.com/, pp. 1-2.

About, Inc., Welcome to About.com, retrieved Jun. 9, 2005, from http://www.about.com, pp. 1-2.

Applied Skills & Knowledge, LLC, "Make Skills-Based Routing Happen," Jun. 3, 2003, retrieved from http://www.appliedskills.com/whitepapers/files/Skills-basedRouting.pdf, 3 pages.

Barlas, D., "Hipbone Connects to Kana," Jan. 5, 2004, retrieved Jun. 8, 2005, from http://www.line56.com/print/default.asp?ArticleID=5255, 1 page.

Calishain, T., "Yahoo! Service Offers More Advice than Expertise," May 6, 2002, retrieved Jul. 16, 2004, from http://www.infotoday.com/newsbreaks/nb020506-1.htm, pp. 1-2.

distributed.net, "distributed.net History & Timeline," retrieved Jun. 8, 2005, from http://www.distributed.net/history.php, pp. 1-7.

distributed.net, "The Organization," retrieved Jun. 8, 2005, from http://www.distributed.net/, pp. 1-2.

Doan, A., "MongoMusic Fans Include Microsoft," Sep. 9, 2000, retrieved Jun. 9, 2005, from http://www.forbes.com/2000/09/09/feat2.html, pp. 1-3.

Dubaud, S., "Advice Site Resort to Legal Counsel," Jan. 4, 2002, retrieved Apr. 29, 2004, from http://news.com.com/2011-1088-801359.html, pp. 1-3.

Elance Inc., Elance Online™—Everyday Outsourcing™, retrieved Jun. 9, 2005, from http://www.elance.com/c/static/main/displayhtml.pl?file=eol.html&module=home, pp. 1-2.

Elance, Inc., "Elance History," retrieved Jun. 8, 2005, from http://www.elance.com/c/static/main/displayhtml.pl?file=heritage.html, pp. 1-3.

eLancer homepage, retrieved Jun. 8, 2005, from http://www.elancer.us/, pp. 1-2.

Epinions, Inc., Epinions.com homepage, retrieved Jun. 9, 2005, from http://www.epinions.com, pp. 1-2.

Fox, S., "Can New Technology Revolutionize the Net?," Jun. 1, 2000, retrieved Jun. 8, 2005, from http://web.archive.org/web/20001018221958/www.cnet.com/insider/0-121949-7-1995365.html, pp. 1-3.

Get a Freelancer.com homepage, Innovate it, retrieved Jun. 9, 2005, from http://www.getafreelancer.com, pp. 1-3.

gonesilent.com homepage, Aug. 22, 2000, retrieved Jun. 8, 2005, from http://web.archive.org/web/20000822122731/www.gonesilent.com/about.html, pp. 1-2.

Google, "Ask a question, Set your Price. Get your Answer.," retrieved Jun. 9, 2005, from http://answers.google.com/answers/, 1 page.

Google, "Your Computer's Idle Time is too Precious to Waste," retrieved Jun. 9, 2005, from http://toolbar.google.com/dc/offerdc.html, 1 page.

Gunn, S., "Hey, buddy, can you spare some cycles?," Sep. 24, 1997, retrieved Jun. 8, 2005, from http://www.cnn.com/TECH/9709/24/netly.news/, pp. 1-4.
Hagel, J. et al., "Go Slowly with Web Services," Feb. 15, 2002, retrieved from http://www.cio.com/archive/021502/keynote.html, 4 pages.
Hagel, J., et al., "Your Next IT Strategy," *Harvard Business Review R0109G*:105-113, Oct. 2001.
Hagel, J., *Out of the Box—Strategies for Achieving Profits today and Growth Through Web Services*, Harvard Business School Publishing, Boston, Massachusetts, 2002, Front Cover through Acknowledgements, Chapter 1, "Responding to Unmet Needs," and Chapter 2, "Web Services Create New Options," pp. i-xix and 1-42, 33 pages.
Ingenio, Inc., Ingenio™ homepage, retrieved Jun. 8, 2005, from http://www.ingenio.com/default.asp?TF=1, pp. 1-2.
Ingenio, Inc., Introducing Ingenio™ Pay Per Call™, retrieved Jun. 8, 2005, from http://www.ingenio.com/documents/corp/home.asp, pp. 1-2.
Ingenio, Inc., KEEN—Your Personal Advisor, retrieved Jun. 8, 2005, from http://www.keen.com, pp. 1-2.
Ingenio, Inc., KEEN—Your Personal Advisor/Get Advice, retrieved Jun. 8, 2005, from http://www.keen.com/categories/get_answers.asp?SRCHT=0&search=&gid=0, 1 page.
Jupitermedia Corporation, "About jGuru.com: Overview," retrieved Jun. 9, 2005, from http://www.jguru.com/misc/about-overview.jsp, pp. 1-2.
Jupitermedia Corportion, jGuru homepage, retrieved Jun. 9, 2005, from http://www.jguru.com, pp. 1-5.
KANA Inc., "Corporate Overview," retrieved Jun. 8, 2005, from http://www.kana.com/about/about.aspx, pp. 1-2.
Katz, J., et al., "The Benefits of a Virtual Contact Center," MCI, Inc., May 2004, retrieved from http://global.mci.com/us/enterprise/insight/whitepapers/pdf/VirtualContactCtr.pdf, 7 pages.
Kenexa, "Call Centers," retrieved Jun. 8, 2005, from http://www.kenexa.com/ind_callcent.html, pp. 1-3.
Lynn, R., "Keeping Online Daters Honest," Apr. 1, 2005, retrieved on Apr. 4, 2005, from http://www.wired.com/news/print/0,1294,67083,00.html, pp. 1-3.
Massive Multiplayer Online Role-Playing Game—homepage, retrieved Jun. 8, 2005, from http://www.mpog.com, pp. 1-2.
Microsoft Corporation, "Microsoft Acquires MongoMusic," Sep. 13, 2000, retrieved Jun. 9, 2005, from http://www.microsoft.com/presspass/press/2000/sept00/mongopr.mspx, pp. 1-2.
Mori, G., et al., "Breaking a Visual CAPTCHA," retrieved Jun. 8, 2005, from http://www.cs.berkeley.edu/~mori/gimpy/gimpy.html, pp. 1-4.
Mossberg, W., "GuruNet as a Reference Tool Goes Beyond Search Engines," Mar. 6, 2003, retrieved Jul. 20, 2004, from http://www.ptech.wsj.com/archive/ptech-20030306.html, pp. 1-3.
Multiplayer Online Games Directory—homepage, retrieved Jun. 8, 2005, from http://www.mpogd.com, 1 page.
Nortel Networks, "Beyond ACD—The advantages of Skill-based Routing in Today's Contact Centers," Mar. 7, 2003, retrieved from http://www.nortelnetworks.com/solutions/ccvp/collateral/nn103640-030703.pdf, 12 pages.
Online Multiplayer Games Network—homepage, retrieved Jun. 8, 2005, from http://www.omgn.com, pp. 1-2.
Project Gutenberg's Distributed Proofreaders—homepage, retrieved Jun. 9, 2005 from http://www.pgdp.net/c/default.php, pp. 1-4.
Rhodes, B., "The Wearable Remembrance Agent: A System for Augmented Memory," Appeared in *Personal Technologies Journal Special Issue on Wearable Computing 1*:218-224, 1997, retrieved Jun. 9, 2005, from http://www.bradleyrhodes.com/Papers/wear-ra-personaltech/, 10 pages.
Serena Software, Inc., "Serena™ Automating Change," retrieved Jun. 9, 2005, from http://www.serena.com, 1 page.
SETI Institute homepage, retrieved Jun. 9, 2005, from http://www.seti.org/site/pp.asp?c=ktJ2J9MMIsE&b=178025, pp. 1-3.
Siebel Systems, Inc., Siebel homepage, retrieved Jun. 8, 2005, from http://www.siebel.com/, pp. 1-3.
Singh, P., "Open Mind: common sense—Teaching computers the stuff we all know," retrieved Jun. 9, 2005, from http://commonsense.media.mit.edu/cgi-bin/search.cgi, pp. 1-2.
Singh, P., "The Open Mind Common Sense Project," Jan. 2, 2002, retrieved Jun. 9, 2005, from http://www.kurzweilai.net/articles/art0371.html, pp. 1-24.
Spice, B., "CMU Student Taps Brain's Game Skills," Oct. 5, 2003, retrieved Jun. 8, 2005, from http://www.post-gazette.com/pg/03278/228349.stm, pp. 1-5.
Spogg.com—homepage, retrieved Jun. 8, 2005, from http://www.spogg.com, pp. 1-2.
Sun Microsystems, Inc., "Products & Technologies—Java Technology," retrieved Jun. 9, 2005, from http://java.sun.com, pp. 1-2.
Sun Microsystems, Inc., "The Jini Technology Series: JavaSpaces Principles, Patterns, and Practice," retrieved Jun. 9, 2005, from http://java.sun.com/docs/books/jini/javaspaces/, pp. 1-2.
TopCoder, Inc., TopCoder homepage, retrieved Jun. 8, 2005, from http://www.topcoder.com/, pp. 1-2.
University of California, "What is SETI@home?," retrieved Jun. 9, 2005, from http://setiathome.ssl.berkeley.edu/, 1 page.
Wilson, B. "Anti-Social Software," Apr. 30, 2004, retrieved Aug. 26, 2005, from http://www.brendonwilson.com/profile/000156.shtml, 5 pages.
Wolverton, T., et al., "Yahoo Launches Advice Site," Apr. 29, 2002, retrieved Apr. 29, 2004, from http://news.com.com/2102-1017_3-894968.html?tag+st.util.print, pp. 1-2.
Texas Governor Rick Perry—Press Release, "Perry Authorizes More Border Security Funding, Virtual Border Watch Program," Jun. 1, 2006, retrieved Jan. 15, 2008, from http://www.governor.state.tx.us/divisions/press/pressreleases/PressRelease.2006-06-01.1612, 2 pages.
MacManus, R., "Still No Killer Apps for Amazon Mechanical Turk," Jan. 11, 2007, retrieved Jan. 16, 2008, from http://www.readwriteweb.com/archives/mechanical_turk_still_no_killer_app.php., 4 pages.
Hof, R., "Amazon's Mechanical Turk," BusinessWeek, Tech Beat, Nov. 4, 2005, retrieved Jan. 16, 2008, from http://www.businessweek.com/the_thread/techbeat/archives/2005/11/amazons_mechani.html, 7 pages.
vBulletinSetup, "Google Asks Surfers for Help," Sep. 6, 2006, retrieved Jan. 16, 2008, from http://forum.vbulletinsetup.com/f10/google-asks-surfers-help-254-print.html, 2 pages.
Silberman, S., "Inside the High Tech Hunt for a Missing Silicon Valley Legend," Wired, Jul. 24, 2007, retrived Jan. 25, 2008, from http://www.wired.com/print/techbiz/people/magazine/15-08/ff_jimgray, 11 pages.
Von Ahn, L., "Human Computation," Dec. 7, 2005, School of Computer Science, Carnegie Mellon University, retrieved from http://reports-archive.adm.cs.cmu.edu/anon/usr/ftp/2005/CMU-CS-05-193.pdf, 87 pages.
Surowiecki, J., "The Wisdom of Crowds," 2005, Random House, pp. 8-10, retrieved from http://books.google.com/books?id=hHUsHOHqVzEC, 10 pages.

* cited by examiner

Task Details
Requestor:
Expiration:
Reward:

Task Description:

Get the prices for the same product from two web sites.

Your task is to obtain the prices for a single product, which 3rd Party Seller Company offers on their own website and also offers on Retailer's website.

2. Obtain the price on Retailer's website.

1.1: Go to http://www.retailer120.com/productID=123120. On the left side at the middle of the page you see two prices.

1.2: The upper price is the product price. Enter that price here: [ ] ~302

2. Obtain the price from 3rd Party Seller Company's website.

Now, you have to do the same task for the same product on http://www.3rdpartyseller140.com 2.1: Find the product with:

Product Title: Digital SLR Camera Kit
Product Brand: Camera Co.

on http://www.3rdpartyseller140.com and enter the product price here: [ ] ~304

2.2 Copy the URL of the product detail page and paste it here: [ ] ~306

2.3 Add the product in the shopping cart. Proceed to checkout and enter an address in the continental United States.

Enter the total price, including shipping, here: [ ] ~308

Figure 3

MONITORING AND ENFORCING PRICE PARITY

BACKGROUND

A retailer who sells items over the Internet may offer hundreds, thousands, or even millions of items for sale. The retailer's item listings, which include information identifying the items and prices of the items, are accessible over the Internet by customers through the retailer's site. In addition to offerings that are available for purchase and fulfillment from the retailer, the retailer may provide a service that allows independent, third-party sellers to offer items for sale through the retailer's site. Under such an arrangement, the retailer typically receives a commission for items that are sold by the third-party sellers through the retailer's site. For example, the commission may equal a portion of the purchase price. In addition, some of these third-party sellers may operate Internet sites themselves through which the third-party sellers also directly offer the same items for sale.

An agreement between a retailer and a third-party seller who offers items for sale through the retailer's site may restrict the third-party seller from selling items at a more expensive price on the retailer's site than through the third-party seller's own sales channels, such as its websites, physical stores, mail order catalogs, etc. This requirement is known as price parity. However, for various reasons, a third-party seller may disregard price parity rules. For example, a third-party seller may offer items for sale at a more expensive price on the retailer's site in an attempt to drive traffic to the third-party seller's site (i.e., as a form of advertising) or to lessen the impact of the retailer's commissions on the third-party seller's margins. When a third-party seller disregards price parity rules, customers who would otherwise visit the retailer's site might check the price of an item on the third-party seller's site first before making a purchasing decision on the retailer's site. Consequently, the retailer may lose customers and sales while bearing the expense of advertising and merchandising the third-party seller's items.

Monitoring and enforcing price parity is a challenge for a retailer who provides hosting services for third-party sellers. For example, to monitor and enforce price parity, a retailer would need to know the landed price of an item (i.e., the product price and the shipping price) at a third-party seller's site and the landed price of that same item at the retailer's own site. Furthermore, the price data from both sites would need to be obtained at substantially the same time, because prices may fluctuate from day to day or during the course of a day.

Due to the volume of product listings (e.g., thousands or even millions) and the differences that exist between sites of third-party sellers, it is a significant challenge to automatically gather the price data using a computer program. For example, a retailer could attempt to code a computer program that gathers price data, but the retailer would need to expend significant time and resources to create such a program. Accordingly, writing a computer program that would accurately gather pricing information from many sites with differing formats is simply not practical. Moreover, even if a retailer was able to obtain accurate price data for items that are sold through third-party sellers' sales channels, the retailer would like to enforce price parity and encourage third-party sellers to adhere to price parity rules. Therefore, there is a need for improved systems and methods for monitoring and enforcing price parity.

BRIEF DESCRIPTION OF THE DRAWINGS

The accompanying drawings, which are incorporated in and constitute a part of this disclosure, illustrate various disclosed embodiments. In the drawings:

FIG. 3 shows an example of a price parity task; and

DETAILED DESCRIPTION

Figure 1:
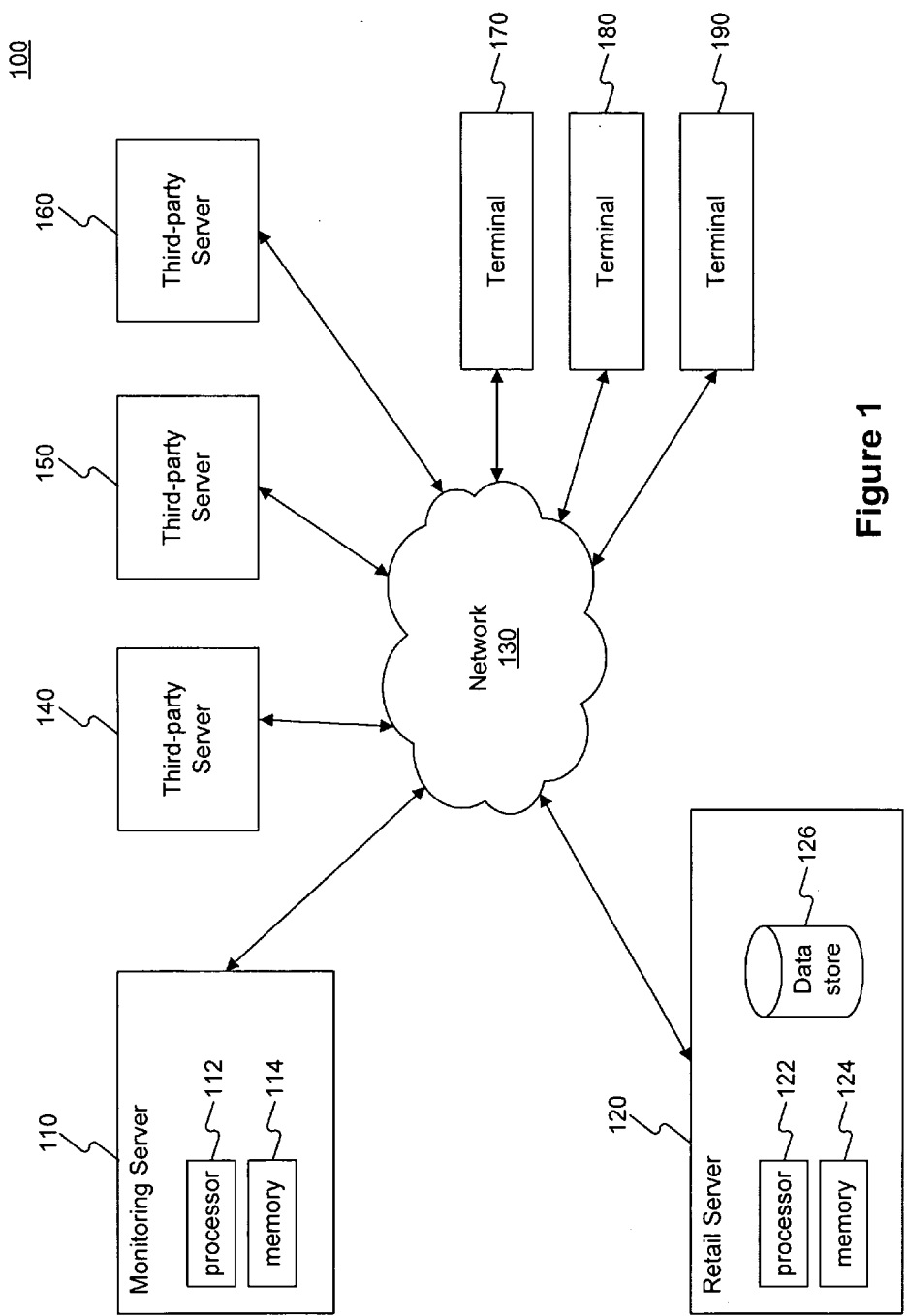
FIG. 1 is a diagram of an example of a system for providing functionality for monitoring and enforcing price parity.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding blocks to the disclosed methods. Accordingly, the following detailed description is not limiting of the disclosed embodiments. Instead, the proper scope is defined by the appended claims.

Disclosed systems and methods monitor and enforce price parity using tasks that involve human review and collection of price data. Consistent with disclosed embodiments, price parity tasks are provided for human review in order to collect price data for an item being sold by a third-party seller through a sales channel of a retailer and price data for the same item being sold by the third-party seller through a sales channel of the third-party seller. As the term is used herein, a "sales channel" may refer to any number of ways that a provider of goods or services may offer such goods and services for purchase, rental, download, licensing, leasing, or other forms of consumption. For example, such sales channels could be an Internet site/website, an online store, an electronic auction, an auction, a physical store, a mail order catalog, a telephone based ordering system, a software application providing access to one or more items, among many other possibilities. For example, one or more items being sold by a third-party seller through a sales channel of a retailer and through a sales channel of the third-party seller are identified for monitoring. Price data is gathered and compared in order to determine whether the third-party seller has violating a price parity rule. Furthermore, disclosed systems and methods provide mechanisms for enforcing price party through measures that seek to encourage sellers who violate price parity to remedy the violations.

Consistent with a disclosed embodiment, a computer-implemented method is provided for monitoring price parity. The method includes selecting, by a server, an item from a catalog comprising a plurality of items. The server further selects a third party-seller who offers the item for sale through a sales channel of a retailer and who also offers the item for sale through a sales channel of the third party seller. The method receives an identifier of the sales channel of the third-party seller. The server further generates a price parity task. The price parity task includes instructions for obtaining a first price of the item and instructions for obtaining a second price of the item. The first price corresponds to an offering price of the item by the third-party seller via the sales channel of the retailer and the second price corresponds to an offering price of the item by the third party seller via the sales channel of the third party seller. The server receives, in response to the price parity task, price data. The price data comprises the first price and the second price. The first price was obtained from the sales channel of the retailer and the second price was obtained from the sales channel of the third-party seller. The server evaluates whether the second price violates a price parity rule, based on at least a comparison of the first price and the second price.

Consistent with another disclosed embodiment, a computer-implemented method is provided for monitoring price parity. The method includes generating, by a server, a task related to pricing of an item. The server further receives, in response to the task, a first price and a second price of the item. The first price corresponds to an offering price of the item by a third-party seller via a sales channel of a retailer and the second price corresponds to an offering price of the item by the third party seller via a sales channel of the third party seller. The server evaluates whether the second price violates a price parity rule, based on at least a comparison of the first price and the second price.

Consistent with yet another disclosed embodiment, a system is provided for monitoring price parity. The system may include a processor for executing program instructions and a memory storing the program instructions. The program instructions, when executed by the processor, perform a process. The process includes generating a task related to pricing of an item and receiving, in response to the task, a first price and a second price of the item. The first price corresponds to an offering price of the item by a third-party seller via a sales channel of a retailer and the second price corresponds to an offering price of the item by a third party seller via a sales channel of the third party seller. The server evaluates whether the second price violates a price parity rule, based on at least a comparison of the first price and the second price.

Consistent with yet another disclosed embodiment, a method is provided for monitoring price parity. The method includes generating, by a server, a task related to pricing of an item. The server receives, in response to the task, a first price of the item. The first price corresponds to an offering price of the item by a third party seller via a sales channel of the third party seller. The method further includes obtaining, from a data store, a second price of the item. The second price corresponds to an offering price of the item by the third-party seller via a sales channel of a retailer. The server evaluates whether the second price violates a price parity rule, based on at least a comparison of the first price and the second price.

Consistent with other disclosed embodiments, computer-readable storage media may store program instructions, which when executed by a processor, perform any of the methods described herein.

FIG. 1 is an example of a system 100 for monitoring and enforcing price parity, consistent with a disclosed embodiment. System 100 may provide functionality for monitoring and enforcing price parity rules for items offered for sale by a third-party seller via a sales channel of the retailer and via the sales channel of the third-party seller. As shown in system 100, monitoring server 110, retail server 120, third-party servers 140-160, and terminals 170-190 are connected to a network 130. One of skill in the art will appreciate that although one monitoring server, one retail server, three third-party servers, and three terminals are depicted in FIG. 1, any number of these components may be provided. Furthermore, one of ordinary skill in the art will recognize that one or more components of system 100 may be combined and/or divided into subcomponents. For example, functionality provided by monitoring server 110 and retail server 120 may be combined or functionality provided by monitoring server 110 and/or retail server 120 may be subdivided across multiple components.

Network 130 provides communications between the various components in system 100, such as monitoring server 110, retail server 120, third-party servers 140-160, and terminals 170-190. In addition, monitoring server 110, retail server 120, third-party servers 140-160, and/or terminals 170-190 may access legacy systems (not shown) via network 130, or may directly access legacy systems, data stores, or other network applications. Network 130 may be a shared, public, or private network, may encompass a wide area or local area, and may be implemented through any suitable combination of wired and/or wireless communication networks. Network 130 may further comprise an intranet or the Internet.

Monitoring server 110 may comprise a general purpose computer (e.g., a personal computer, network computer, server, or mainframe computer) having one or more processors that may be selectively activated or reconfigured by a computer program. Monitoring server 110 may also be implemented in a distributed network. For example, monitoring server 110 may communicate via network 130 with one or more additional monitoring servers (not shown), which may enable monitoring server 110 to distribute processes for parallel execution by a plurality of monitoring servers. Alternatively, monitoring server 110 may be specially constructed for carrying-out methods consistent with disclosed embodiments.

Monitoring server 110 may include a processor 112 and a memory 114. Memory 114 may comprise one or more memory or storage devices that store data as well as software. Memory 114 may also comprise, for example, one or more of RAM, ROM, magnetic storage, or optical storage. Memory 114 may store program modules that, when executed by processor 112, perform one or more processes for monitoring and/or enforcing price parity. For example, authentication server 110 may provide access to an Internet site or other application, as well as provide functionality for authenticating users and for transmitting data, such as one or more price parity tasks.

Retail server 120 may comprise a general purpose computer (e.g., a personal computer, network computer, server, or mainframe computer) having one or more processors that may be selectively activated or reconfigured by a computer program. Retail server 120 may also be implemented in a distributed network. For example, retail server 120 may communicate via network 130 with one or more additional servers (not shown), which may enable retail server 120 to distribute processes for parallel execution by a plurality of retail servers. Alternatively, retail server 120 may be specially constructed for carrying-out methods consistent with disclosed embodiments.

Retail server 120 may include a processor 122 and a memory 124. Memory 124 may comprise one or more memory or storage devices that store data as well as software. Memory 124 may also comprise, for example, one or more of RAM, ROM, magnetic storage, or optical storage. Memory 124 may store program modules that, when executed by processor 122, perform one or more processes for providing content for one or more Internet sites or an application providing content that is viewable by one of terminals 170-190. For example, retail server 120 may serve a document providing the content (e.g., an e-commerce site).

Retail server 120 may further include a data store 126. In one embodiment, data store 126 may constitute a catalog data store and may store data describing items (e.g., products and/or services) being offered for sale. For example, data store 126 may store documents or pages that are displayable by a computer executing software, such as an Internet browser. Furthermore, data store 126 may store product and/or service descriptions, prices, and media used in connection with the sale of the products and/or services. Media may include any images, photographs, sounds, and/or video clips that provide samples and/or information pertaining to the products and/or services.

Data store 126 may store unique identifiers (IDs) that identify the products and/or services being offered for sale through retail server 120. For example, the IDs may include product names and/or product numbers, UPCs (Universal Product Codes), ISBNs (International Standard Book Numbers), or any other identifier. Additionally, data store 126 may store metadata in association with the IDs. For example, the metadata may provide information describing and/or classifying a product. Data store 126, although shown as being part of retail server 120, may instead be provided as part of a separate server (not shown) that may be in direct communication with retail server 120 or that may communicate with retail server 120 over network 130.

Users may access retail server 120 over network 130 through an Internet browser or a software application running on terminals 170-190. For example, retail server 120 may transmit a document (e.g., a JavaScript Object Notation (JSON) document, an Extensible Markup Language (XML) document, or a web page) that is accessible by an Internet browser executing on one of terminals 170-190. Because the Internet site may use a secure communication environment, such as an HTTPS (hypertext transfer protocol secure) environment to transfer data over network 130, data transfer is assumed to be secure.

Third-party servers 140-160 may each comprise a general purpose computer (e.g., a personal computer, network computer, server, or mainframe computer) having one or more processors that may be selectively activated or reconfigured by a computer program. Third-party servers 140-160 may each communicate via network 130 with one or more additional servers (not shown), which may enable third-party servers 140-160 to distribute processes for parallel execution by a plurality of retail servers. Alternatively, third-party servers 140-160 may be specially constructed for carrying-out methods consistent with disclosed embodiments.

Third-party servers 140-160 may each include a processor (not shown) and a memory (not shown). For example, each of third-party servers 140-160 may provide content for an application or one or more Internet sites and may serve documents providing the content (e.g., e-commerce sites). Third-party servers 140-160 may each further include a data store (not shown) storing data describing items (e.g., products and/or services) that are being offered for sale. As discussed above in connection with retail server 120, third-party servers 140-160 may each store documents or pages that are displayable by a computer executing software, such as an Internet browser, as well as may store product and/or service descriptions, prices, and media used in connection with the sale of the products and/or services. For example, similar to the discussion above in connection with retail server 120, third-party servers 140-160 may each store identifiers (IDs) that identify products and/or services being offered for sale (e.g., the IDs may include product names and/or product numbers, UPCs, ISBNs, or any other identifier). Furthermore, third-party servers 140-160 may each store metadata in association with the IDs (e.g., metadata providing information describing and/or classifying a product).

Terminals 170-190 may be any type device for communicating with monitoring server 110, retail server 120, and/or third-party servers 140-160 over network 130. For example, terminals 170-190 may be personal computers, handheld devices (e.g.; PDAs, cellular phones, electronic book readers, etc.), set top boxes, or any other appropriate computing platform or device capable of exchanging data with network 130. Terminals 170-190 may each include a processor and a memory (not shown). Furthermore, terminals 170-190 may execute program modules that provide one or more graphical user interfaces (GUIs) for interacting with network resources, such as monitoring server 110, retail server 120, and/or third-party servers 140-160.

For example, a user at one of terminals 170-190 may access monitoring server 110 and receive data pertaining to a price parity task. The price parity task may include instructions for conducting a human review of price data. For example, one of terminals 170-190 may receive a task identifying an item and a third-party seller. The user may then research the offering price of the item through a sales channel provided by retail server 120 (e.g., a site hosted by retail server 120) and the offering price of the item through the sales channels of one or more of third-party servers 140-160 (e.g., sites hosted by one or more of third-party servers 140-160). In some embodiments, the sales channel of the third-party seller is not hosted on retail server 120, such as if the sales channel is a mail order catalog or telephone ordering system. In such cases, the user can research the offering price by obtaining the mail order catalog or calling the telephone ordering system. The task also may request that the user obtain the shipping price of the item or a total price of the item including a shipping cost, promotional discount, and/or a tax as offered through the third-party sales channel.

Although embodiments have been described in which a task worker obtains price information from both the retailer and the third-party sales channels, in some embodiments, a user may only need to obtain a price of an item (e.g., a price of the item or a total price) from a third-prty seller's sales channel as part of a price parity task. For example, in some embodiments, monitoring server 110 may be able to obtain the item information (e.g., price, etc.) from the retailer's sales channel such that it is not necessary for the task worker to manually obtain this information.

In order to obtain accurate price data, monitoring server 110 may require that the price data for an item being offered by a third-party via a retailer's sales channel (e.g., offered by the third-party via a site hosted by retail server 120) and the price data for that same item being offered by the third-party's own sales channel (e.g., offered by the third-party via a site hosted by third-party server 140) be obtained at substantially the same time. For example, price parity tasks typically should be completed with a certain time period (e.g., a minute, ten minutes, twenty minutes, an hour, etc.). Furthermore, when monitoring server 110 receives price data for a completed task (e.g., a price of an item being offered for sale through a third-party seller's sales channel), the data may include a time stamp indicating when the completed task was submitted to monitoring server 110. Monitoring server 110 may then use the time stamp information to look up the price of that same item being offered for sale by the third-party seller via a sales channel provided by retail server 120 (e.g., the price data may be retrieved from data store 126).

The user may submit the price data from one of terminals 170-190 to monitoring server 110. In exchange for the user's time and effort to complete the task, the user may receive compensation (e.g., a monetary payment, a discount, a free gift, etc.). By obtaining the price data through the use of human review, system 100 may accurately obtain the product price (both through the retailer and the third-party seller's sales channels) and also may obtain the total price (e.g., including a shipping cost, promotional discount, and/or tax)

through the retailer's sales channel. Furthermore, by distributing the tasks amongst a plurality of users, the tasks may be completed efficiently and in a cost effective manner. Additional details describing systems and methods for performing human review of data are provided, for example, in U.S. application Ser. No. 12/020,469, filed Jan. 25, 2008, entitled "Managing Performance of Human Review of Media Data," the entire contents of which are expressly incorporated herein by reference.

Figure 2:
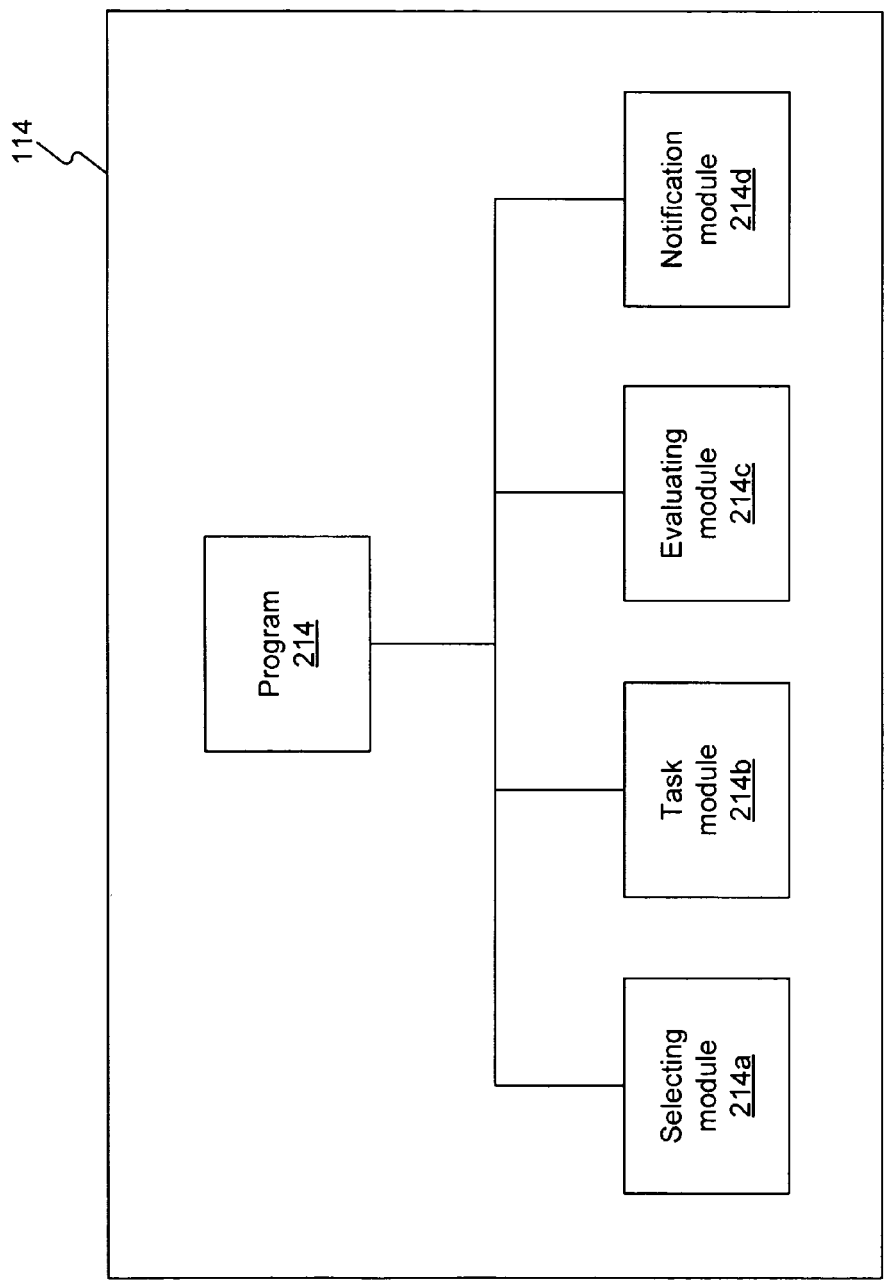
FIG. 2 shows a diagram of an example of a software architecture providing functionality for monitoring and enforcing price parity.

FIG. 2 is diagram of an example of a software architecture providing functionality for monitoring and enforcing price parity, consistent with a disclosed embodiment. The software architecture may be stored in, for example, memory 114 of monitoring server 110, as shown in FIG. 1. Such functionality may be provided through a user interface or an application programming interface (API) that receives requests for various testing services from testing server 110. A request for a service may encompass any direct or indirect mechanism by which monitoring server 110 (or other software residing on another computer) provides information that invokes certain behavior in another software component.

In one embodiment, memory 114 may store instructions of program 214, which when executed, perform one or more data processes (e.g., services) for monitoring and enforcing price parity. To do so, program 214 may include instructions in the form of one or more program modules 214a-214d. Program modules 214a-214d may include an selecting module 214a, a task module 214b, an evaluating module 214c, and a notification module 214d.

Selecting module 214a may identify items (e.g., products and/or services) that are offered for sale by third-party sellers via a sales channel provided by retail server 120 (e.g., a site hosted by retail server 120) and that are also offered for sale by third-party sellers via sales channels provided by one or more of third-party servers 140-160 (e.g., sites hosted by one or more of third-party servers 140-160). Selecting module 214a may retrieve, for example, unique IDs that identify the products and/or services being offered for sale through retail server 120 (e.g., UPCs, ISBNs, or any other identifier).

Selecting module 214a may identify items based on any number of criteria. For example, selecting module 214a may identify items that have high visibility (e.g., items that are viewed by many visitors) or are bestsellers (e.g., items that are overall best sellers, best sellers in a product category, etc.). For example, if an item listing of a third-party seller is viewed or accessed frequently through a sales channel provided by retail server 120, but the item is not sold frequently via retail server 120, this may indicate that the price being offered by a third-party seller via the sales channel provided by retailer server 120 is higher than the price of that same item being offered via the third-party seller's own sales channel.

Furthermore, selecting module 214a may identify third-party sellers and the sales channels of third-party sellers. To identify a third-party seller, selecting module 214a may determine one or more third-party sellers offering an item for sale having an identifier corresponding to an item of interest. To identify a third-party seller's sales channel, monitoring server 120 may retrieve from data store 126 of retail server 120 reflecting an account of the third-party seller, which may include an address (e.g., a uniform resource locator (URL) of the third-party seller's website, among other possibilities) and/or an email address for a contact person for the third-party seller. Alternatively, selecting module 214a may receive identification information over network 130 from, for example, one of terminals 170-190 as part of a separate task performed by human review.

Task module 214b may generate a price parity task. For example, the price parity task may provide tasks details (e.g., a requestor, an expiration date for the task, and a reward for completing the task). Furthermore, the price parity task may include a price description, which may describe steps that need to be taken in order to complete the task (e.g., obtaining a price of an item being offered by a third-party seller via a sales channel of a retailer and obtaining the price of the same item being offered by the third-party seller via the third-party seller's sales channel). The price parity task may require a person who performs the task to obtain a total price of a product, including a shipping cost, a promotional discount, and/or a tax. Task module 214b may further transmit the task to one or more of terminals 170-190 for human review. Additional details regarding price parity tasks are discussed below in connection with FIG. 3.

Evaluating module 214c may receive price data from one of terminals 170-190 responsive to a task and then evaluate the price data. The price data may include a first price of an item, which corresponds to an offering price of the item by a third-party seller via a sales channel of a retailer, and a second price of the item, which corresponds to an offering price of the item by the third-party seller via a sales channel of the third-party seller. Evaluating module 214c may then evaluate whether a seller respects price parity for the item. For example, the evaluation may comprise comparing the first price and second price to determine whether the second price is greater than the first price.

As part of the evaluation, monitoring server 110 also may receive price data responsive to the same task from more than one person. For example, in some embodiments, monitoring server 110 may distribute the same task to two or more persons in order to verify whether the results are accurate. For example, evaluating module 214c may compare results received from two or more persons for the same task and determine whether or not the results are accurate (e.g., if two of three persons have submitted the same price data, evaluating module 214c may assume that the price data is accurate).

Evaluating module 214c may further apply thresholds to determine whether or not a third-party seller has violated a price parity rule. For example, evaluating module 214c may determine that a violation has occurred when a difference in price of an item through a third-party seller's sales channel differs more than a threshold amount or a predefined percentage (e.g., one percent, two percent, five percent, etc.) of the price of the same item being offered by the third-party seller via a sales channel provided by retailer server 120. In some embodiments, evaluating module 214c may compare prices of an item without taking into account shipping costs. In other embodiments, evaluating module 214c may compare the shipped prices of an item. In still yet other embodiments, evaluating module 214c may take into account other factors, such as promotional discounts and/or taxes.

Notification module 214d may generate and transmit various notifications regarding results of evaluations executed by evaluation module 214c. For example, if a third-party seller is determined by evaluation module 214c to be in violation of price parity rules (e.g., the third-party seller offers an item at a higher price via a sales channel that is provided by retail server 120 than via its own sales channel), then notification module 214d may generate and transmit a notification to a contact person associated with the third-party seller. The notification may provide notice to the third-party seller of the violation. The notification may be transmitted, for example, via email to an email address of the contact person obtained from, for example, data store 126. Notification module 214d may further transmit a message to task module 214b to schedule the same price parity task to be performed at a later date and/or time (e.g., a hour later, a day later, a week later, etc.) in order to determine whether the violation has been remedied. If the violation has not been remedied when the results of the follow-up price parity task are evaluated, then notification module 214d may generate and transmit another notification.

Notifications may escalate in levels of urgency. For example, a third-party seller having a first violation may receive a yellow notification (e.g., an initial warning), while a third-party seller having a second violation may receive a red notification (e.g., an urgent warning). If after a second violation, for example, a third evaluation may be performed, and the process may be escalated (e.g., notification module 214d may transmit a notification to a representative of retailer 120 instructing the representative to contact the third-party seller by telephone). Various actions may be taken if the price is not corrected (e.g., retailer 120 may deny the third-party seller from completing a sale of the item, remove the third-party seller's item listing entirely, suspend the third-party seller's account, or terminate the third-party seller's account).

On the other hand, if evaluation module 214c determines that a third-party seller has not violated price parity rules, notification module 214d may generate and transmit to a contact person (e.g., via an email address) a notification (e.g., a positive notification) informing the third-party retailer of the positive result and/or thanking the third-party seller for complying with price parity rules. Furthermore, in some embodiments, notification module 214d may receive feedback from a third-party seller in response to the notifications (e.g., a third-party seller may complete a contact form and select a reason for the price discrepancy).

Notification module 214d may further generate and transmit notifications based on aggregate results of price parity tasks. For example, notification module 214d may determine that a notification need not be sent to a third-party seller that offers a high number of items (e.g., a hundred item listings) and who is found to only have a small number of price parity violations (e.g., one violation, fewer than five violations, etc.). On the other hand, a third-party seller having a large number of violations (e.g., fifty percent of the third-party seller's items that are being offered via the third-party seller's sales channel are being offered at prices that violate price parity) may receive a notification. Notification module 214d may further generate reports summarizing results of price parity tasks.

FIG. 3 shows an example of a price parity task 300, consistent with a disclosed embodiment. For example, a user at one of terminals 170-190 may receive price parity task 300 from monitoring server 110 in which the user is requested to determine a third-party seller's product price and shipping price for five products as offered through a sales channel provided by retail server 120 (e.g., a site hosted by retail server 120) and the product price and shipping price for the same five products via the third-party seller's sales channel (e.g., a site hosted by third-party server 140). Price parity task 300 may comprise a document (e.g., a JavaScript Object Notation (JSON) document, an Extensible Markup Language (XML) document, or a web page).

Price parity task 300 may include information pertaining to, for example, a requestor of the task, a expiration date of the task, and a reward for completing the task. Furthermore, price parity task 300 may provide instructions as part of a task description. For example, price parity task 300 instructs a user who completes the task that the user should obtain the prices for the same product from two sales channels (e.g., two sites). The task further instructs the person to obtain the prices for the product, which Third Party Seller Company offers on their own sales channel (e.g., a site hosted by third-party server 140) and also the price of the same product, which Third Party Seller Company offers via a retailer's sales channel (e.g., a site hosted by retail server 120).

A user who collects the identified price data and completes the task may enter a price of an item (e.g., a camera) that is being offered by Third Party Seller Company via retail server 110 using field 302 of a form. The user may further enter the price of the same product that is being offered by Third Party Seller Company via a sales channel provided by third-party server 130 via field 304. Furthermore, the user may enter or copy the URL of a product detail page (e.g., an item listing page) from third-party server 130 in field 306. In some embodiments, a subsequent task may incorporate the URL submitted by a user (e.g., the URL entered into field 306). Finally, the user may enter the total price of the product, including shipping, that is found via a sales channel provided by third-party seller 130 in field 308.

In other embodiments, a task may include more than one item (e.g., a task may include five products per task). Furthermore, the format of the price parity task and the information that is requested by a price parity task may vary. For example, a price parity task may also instruct the user to submit information regarding shipping, promotional discounts, and/or taxes. In other embodiments, a user may enter only the price of the item offered by a third-party seller's sales channel and monitoring server 110 may look up the price of that same item being offered for sale by the third-party seller via a sales channel of a retailer.

Figure 4:
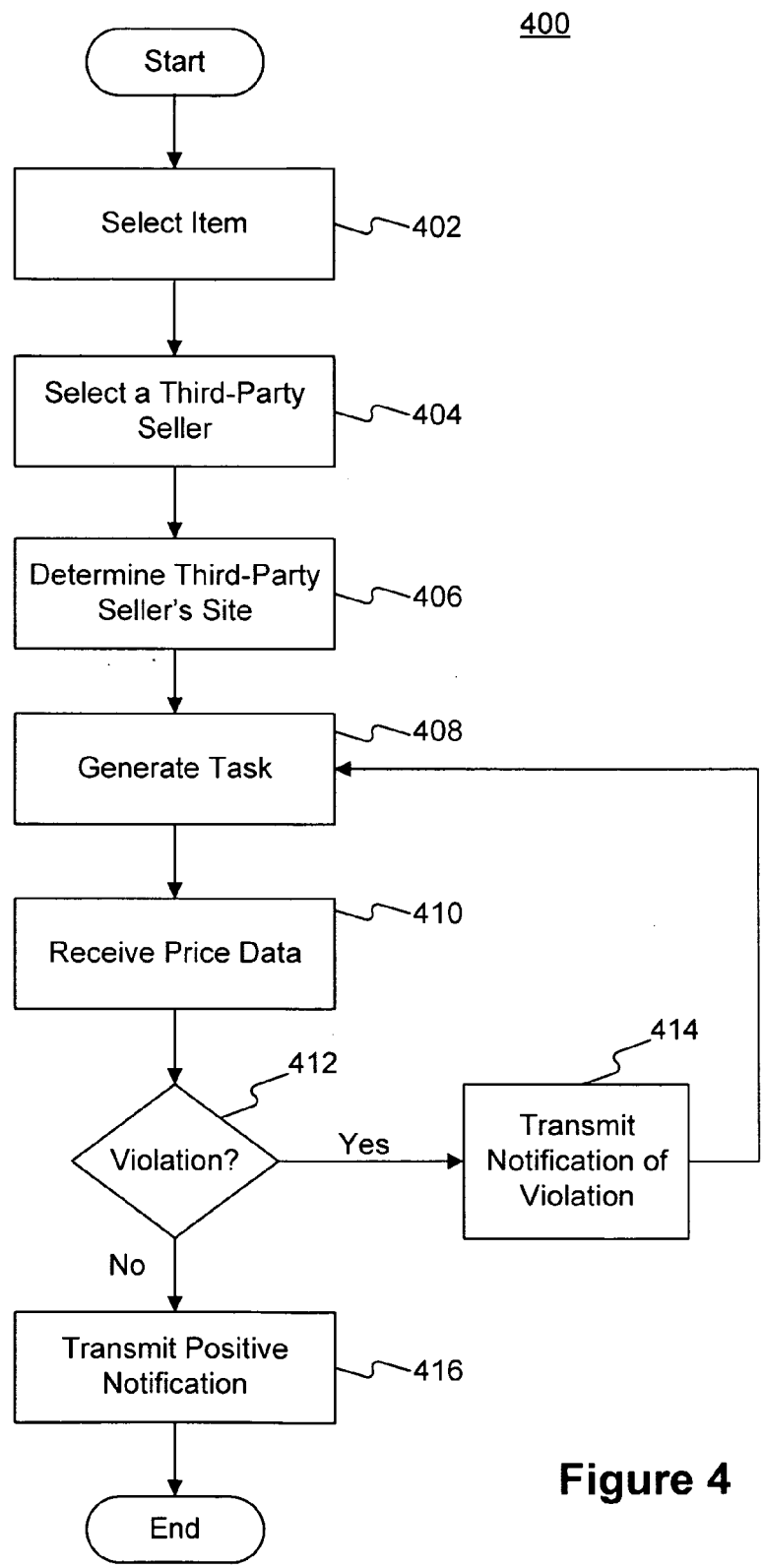
FIG. 4 is a flow diagram of an example of a routine for monitoring and enforcing price parity.

FIG. 4 is a flow diagram of an example of a routine 400 for monitoring and enforcing price parity, consistent with a disclosed embodiment. Routine 400 provides an overview of a process in which monitoring server 110 facilitates a price parity task and/or enforces price parity rules.

Prior to the start of routine 400, a user may be authenticated by, for example, monitoring server 110. For example, prior to the start of routine 300, monitoring server 110 may transmit a document (e.g., a web page) that is accessible by an Internet browser executing on, for example, terminal 170. The document may include options for a user to log onto a secure site or portal provided by monitoring server 110. The user may log on by supplying credentials, such as a username and a password. Once authenticated, routine 400 may begin.

In block 402, monitoring server 110 may select an item (e.g., a product or service) for a price parity task. For example, monitoring server 110 may select an item that is offered for sale by a third-party seller via a sales channel provided by retail server 120 (e.g., a site hosted by retail server 120, a physical store, etc.) and that is also offered for sale by the third-party seller via a sales channel provided by the third-party (e.g., a site hosted by third party server 140, a physical store, etc.). Items may be selected based on various criteria, as discussed above (e.g., high visibility items that are viewed by many visitors to the sales channel, items that are bestsellers overall or in a category, etc.). As part of block 402, monitoring server 110 may retrieve from data store 126 data reflecting an ID of the item (e.g., UPCs, ISBNs, or any other identifier).

In block 404, monitoring server 110 may select a third-party seller who offers the selected item for sale. For example, as part of block 404, monitoring server 110 may retrieve data from data store 126 of retail server 120 reflecting an identifier (e.g., a name, an address, a number, etc.) of the third-party seller. Furthermore, as part of block 404, monitoring server 110 may select multiple third-party sellers who sell the selected item.

In block 406; monitoring server 110 may determine the third-party seller's sales channel. For example, monitoring server 120 may retrieve data from data store 126 of retail server 120 storing account information for the third-party seller, which may include an address (e.g., a uniform resource locator (URL) of the third-party seller's website). Monitoring server 110 may further retrieve an email address for a contact person associated with the third-party seller's sales channel. Alternatively, in block 404, monitoring server 110 may receive identification information (e.g., an identifier such as a URL) over network 130 from one of terminals 170-190. For example, obtaining the identification information may have been part of a separate task that was performed by human review via one or more of terminals 170-190.

In block 408, monitoring server 110 may generate a price parity task. For example, the price parity task may provide tasks details (e.g., a requestor, an expiration date for the task, and a reward for completing the task). The price parity task may include a task description, which may describe steps of the task (e.g., obtaining a price of an item being offered by a third-party retailer via a sales channel of retailer 120 and obtaining the price of the same item being offered by the third-party retailer via a sales channel of the third-party retailer). A task also may require a person who undertakes the task to have certain qualifications (e.g., language skills, a minimum level of experience, expertise in a particular field, etc.). These qualifications may be enforced through qualification mechanisms, such as a test that a person who wishes to perform a task must first pass. Furthermore, the price parity task may require a person who performs the task to obtain a total price of a product, including shipping and/or tax. In other embodiments, monitoring server 110 may look up the price of the item via a sales channel provided by a retailer and, consequently, the price parity task may only require obtaining the offering price of the item through the sales channel of the third-party seller. As part of block 408, monitoring server 110 may further transmit the task to one or more of terminals 170-190 for human review.

In block 410, monitoring server 110 may receive price data from one or more of terminals 170-190 responsive to a task. For example, the price data may include a first price of an item, which corresponds to an offering price of the item by a third-party seller via a sales channel of a retailer (e.g., via a site, electronic catalog, among other possibilities), and a second price of the item, which corresponds to an offering price of the item by the third-party seller via a sales channel of the third-party seller (e.g., via a site, electronic catalog, among other possibilities).

In block 412, monitoring server 110 may evaluate whether a seller is compliant with price parity for the item. For example, the evaluation may comprise comparing the first price and second price to determine whether the second price is greater than the first price. If monitoring server 110 determines that a violation has occurred in block 412, then routine 400 may proceed to block 414. If monitoring server 110 determines that a violation has not occurred in block 412, then routine 400 may proceed to block 416.

As part of block 412, monitoring server 110 may apply thresholds to determine whether or not a third-party seller has violated price parity rules. As discussed above, monitoring server 110 may determine that a violation occurs when a difference in price of an item via a third-party seller's sales channel differs more than a threshold amount or a predefined percentage (e.g., one percent, two percent, five percent, etc.) of an amount of the price of the same item being offered by the third-party seller via retailer server 120. In some embodiments, the evaluation may compare prices of an item without taking into account shipping costs. In other embodiments, the evaluation may take into consideration the shipped price of an item. In still yet other embodiments, evaluating module 214c may take into account other factors, such as promotional discounts and/or taxes.

In order to make an evaluation in block 412, monitoring server 110 also may receive price data responsive to the same task from one or more persons. For example, monitoring server 110 may compare results received from two or more persons for the same task and determine whether or not the results are accurate (e.g., if two of three persons have submitted the same price data, monitoring server 110 may consider the price data to be accurate).

In block 414, monitoring server 110 may generate and transmit a notification. For example, if the third-party seller is in violation of price parity rules (e.g., the third-party seller offers an item at a higher price via a sales channel of retail server 120 than via its own sales channel or exceeds a threshold), then monitoring server 110 may generate and transmit a notification to a contact person associated with the third-party seller providing notice to the third-part seller of the violation. The notification may be transmitted, for example, via email to an email address of the contact person obtained from, for example, data store 126. Routine 400 may then return to block 408.

In block 416, monitoring server 110 may generate and transmit a positive notification to inform the third-party retailer that the third-party seller is compliant with price parity rules. This notification may encourage the third-party seller to continue to comply and may also serve to inform the third-party seller that price parity is being monitoring and enforced.

As one of ordinary skill in the art will appreciate, one or more of blocks 402-416 may be optional and may be omitted from implementations in certain embodiments. Furthermore, functionality provided by one or more of blocks 402-416 may be subdivided into multiple blocks or combined.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Furthermore, the blocks of the disclosed routines may be modified in any manner, including by reordering blocks and/or inserting or deleting blocks. It is intended, therefore, that the specification and examples be considered as illustrative only, with a true scope and spirit being indicated by the following claims and their full scope of equivalents.

What is claimed is:

1. A computer-implemented method for monitoring price parity, comprising:
    selecting, by a configured server computer, a first product from a catalog comprising a plurality of products available for sale;
    selecting, by the configured server computer, a third party-seller who offers the first product for sale through a sales channel of a retailer and who also offers the first product for sale through a sales channel of the third-party seller;
    receiving an identifier of the sales channel of the third-party seller;
    generating, by the configured server computer, a price parity task, the price parity task including
    instructions for obtaining a first price of the first product, the first price corresponding to an offering price of the first product by the third-party seller via the sales channel of the retailer, and
    instructions for obtaining a second price of the first product, the second price corresponding to an offering price of the first product by the third-party seller via the sales channel of the third-party seller;
    submitting the price parity task for performance by one or more humans to obtain information about the first price and the second price;
    receiving, by the configured server computer, in response to the performance of the price parity task by at least one of the one or more humans, price data comprising the first price and the second price, the first price having been obtained from the sales channel of the retailer and the second price having been obtained from the sales channel of the third-party seller;
    evaluating, by the configured server computer, a price parity rule based on at least a comparison of the first price and the second price and determining that the price parity rule is violated; and
    providing, by the configured server computer, a notification that the price parity rule is determined to be violated.

2. The computer-implemented method of claim 1, wherein the configured server computer is operated by the retailer who offers the first product for sale.

3. The computer-implemented method of claim 1, wherein the sales channel of the retailer is a first Internet site, and wherein the sales channel of the third-party seller is a second Internet site.

4. The computer-implemented method of claim 1, wherein the identifier of the sales channel of the third-party seller is a uniform resource locator.

5. The computer-implemented method of claim 1, wherein the price parity task comprises a form that includes a first field for entering the first price and a second field for entering the second price.

6. The computer-implemented method of claim 1, wherein the price parity task further includes instructions for obtaining a total price of the first product from the third-party sales channel, the total price including a shipping cost, and wherein the evaluating of the price parity rule includes evaluating whether the total price violates the price parity rule.

7. The computer-implemented method of claim 1, wherein the price parity task further includes instructions for obtaining a total price of the first product from the third-party sales channel, the total price including one or more of a promotional discount and a tax, and wherein the evaluating of the price parity rule includes evaluating whether the total price violates the price parity rule.

8. The computer-implemented method of claim 1, wherein the evaluating of the price parity rule includes applying a threshold to a difference between the second price and the first price, the price parity rule being violated when the second price exceeds the first price by the threshold.

9. The computer-implemented method of claim 8, wherein the threshold is a fixed amount or a percentage.

10. A computer-implemented method for monitoring price parity, comprising:
    generating, by at least one server computer, a task related to obtaining a first price and a second price of a first item, the first item being at least one of a product and a service available for purchase, the first price corresponding to an offering price of the first item by a third-party seller via a sales channel of a retailer and the second price corresponding to an offering price of the first item by the third-party seller via a sales channel of the third-party seller;
    receiving, by the at least one server computer, in response to the task, the first price and the second price of the first item;
    evaluating, by the at least one server computer, a price parity rule based on at least a comparison of the first price and the second price, and determining that the price parity rule is violated; and
    providing, by the at least one server computer, a notification that the price parity rule is determined to be violated.

11. The computer-implemented method of claim 10, wherein the price parity rule is violated when the first price exceeds the second price.

12. The computer-implemented method of claim 10, wherein the evaluating the price parity rule includes applying a threshold to a difference between the second price and the first price, the price parity rule being violated when the second price exceeds the first price by the threshold.

13. The computer-implemented method of claim 12, wherein the threshold is a fixed amount or a percentage.

14. The computer-implemented method of claim 10, wherein the first item is one of a plurality of products included in a catalog available from the third-party seller.

15. The computer-implemented method of claim 10, wherein the sales channel of the retailer is at least one of a first Internet site, a first mail order catalog, a first telephone ordering system, and a first software application.

16. The computer-implemented method of claim 15, wherein the sales channel of the third-party seller is at least one of a second Internet site, a second mail order catalog, a second telephone ordering system, and a second software application.

17. The computer-implemented method of claim 10, wherein the sales channel of the third-party seller is identified by a uniform resource locator.

18. The computer-implemented method of claim 10, wherein the price parity task has an associated form that includes fields for entering the first price and the second price, wherein the method further includes initiating submission of the price parity task for performance by one or more humans that includes supplying values for the fields included in the form, and wherein the received response to the task are results of the performance by at least one of the one or more humans.

19. The computer-implemented method of claim 10, wherein the task further includes instructions for obtaining a total price of the item via the third-party sales channel, the total price including a shipping cost, and wherein the evaluating of the price parity rule includes evaluating whether the total price violates the price parity rule.

20. The computer-implemented method of claim 10, wherein the task further includes instructions for obtaining a total price of the item via the third-party sales channel, the total price including one or more of a promotional discount and a tax, and wherein the evaluating of the price parity rule includes evaluating whether the total price violates the price parity rule.

21. The computer-implemented method of claim 10 wherein the providing of the notification includes
transmitting a warning notification to the third-party seller to indicate that the second price violates the price parity rule.

22. A system for monitoring price parity, comprising:
a processor for executing program instructions; and
a memory storing the program instructions, the program instructions, when executed by the processor, performing a process to:
generate a task related to obtaining a first price and a second price of an item, the first price corresponding to an offering price of the item by a third-party seller via a sales channel of a retailer and the second price corresponding to an offering price of the item by the third-party seller via a sales channel of the third-party seller;
receive, in response to the task, the first price and the second price of the item;
evaluate a price parity rule, based on at least a comparison of the first price and the second price, and determine that the price parity rule is violated; and
provide a notification that the price parity rule is determined to be violated.

23. The system of claim 22, wherein the price parity rule is violated when the second price exceeds the first price.

24. The system of claim 22, wherein the evaluating of the price parity rule includes applying a threshold to a difference between the second price and the first price, the price parity rule being violated when the second price exceeds the first price by the threshold.

25. A computer-implemented method for monitoring price parity, comprising:
generating, by at least one server computer, a task related to obtaining a first price of a first item, the first item being at least one of a product and a service available for purchase, the first price corresponding to an offering price of the first item by a third-party seller via a sales channel of the third-party seller;
receiving, by the at least one server computer, in response to the task, the first price of the first item;
obtaining, from a data store, a second price of the first item, the second price corresponding to an offering price of the first item by the third-party seller via a sales channel of a retailer;
evaluating, by the at least one server computer, a price parity rule based on at least a comparison of the first price and the second price, and determining that the price parity rule is violated; and
providing, by the at least one server computer, a notification that the price parity rule is determined to be violated.

* * * * *